US009113360B2

(12) United States Patent
Sahlin et al.

(10) Patent No.: US 9,113,360 B2
(45) Date of Patent: Aug. 18, 2015

(54) METHOD AND DEVICE FOR SINR ESTIMATION

(75) Inventors: Henrik Sahlin, Molnlycke (SE); Roland Carlsson, Ojersjo (SE); Aare Mallo, Gothenburg (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 177 days.

(21) Appl. No.: 13/704,666

(22) PCT Filed: Jun. 16, 2010

(86) PCT No.: PCT/EP2010/058452
§ 371 (c)(1),
(2), (4) Date: Dec. 17, 2012

(87) PCT Pub. No.: WO2011/157291
PCT Pub. Date: Dec. 22, 2011

(65) Prior Publication Data
US 2013/0088950 A1    Apr. 11, 2013

(51) Int. Cl.
*H04W 24/06*    (2009.01)
*H04B 17/336*    (2015.01)
*H04B 17/373*    (2015.01)
*H04B 17/382*    (2015.01)

(52) U.S. Cl.
CPC ............ *H04W 24/06* (2013.01); *H04B 17/336* (2015.01); *H04B 17/373* (2015.01); *H04B 17/382* (2015.01)

(58) Field of Classification Search
CPC .............. H04B 7/006; H04B 17/0077; H04B 17/0075; H04W 24/06
See application file for complete search history.

(56) References Cited

U.S. PATENT DOCUMENTS

| 2007/0099577 A1 | 5/2007 | Lee et al. |
| 2007/0238430 A1 | 10/2007 | Himayat et al. |
| 2008/0049820 A1* | 2/2008 | Jia et al. ................. 375/227 |

(Continued)

FOREIGN PATENT DOCUMENTS

JP    200753733 A    3/2007

OTHER PUBLICATIONS

Wang et al. "Spatial Multiuser Pairing Scheduling Strategies for Virtual MIMO Systems," Nov. 19-21, 2008, IEEE.*

(Continued)

*Primary Examiner* — Jae Y Lee
(74) *Attorney, Agent, or Firm* — Rothwell, Figg, Ernst & Manbeck, P.C.

(57) ABSTRACT

A method (200) for a transceiver in a mobile system for determining the SINR for signals from at least two User Equipments during a future time interval, comprising arranging the transceiver to receive (205) transmissions from User Equipments in the mobile system on one radio channel per User Equipment, choosing (210) the at least two User Equipments from User Equipments which have data to transmit to the transceiver. The method comprises determining (220) the radio channel characteristics during the future time interval for the at least two User Equipments, emulating (230) at least one receiver type available to the transceiver during said future time interval in order to determine a post demodulation channel for the at least two User Equipments, in which emulation the determined radio channel characteristics, and determining (235) an SINR in the transceiver for the at least two User Equipments using the post demodulation channel.

14 Claims, 3 Drawing Sheets

(56) References Cited

U.S. PATENT DOCUMENTS

2008/0058975 A1* 3/2008 Visuri et al. .................. 700/100
2008/0159451 A1 7/2008 Majonen

OTHER PUBLICATIONS

Search Report dated Feb. 8, 2014, issued in Chinese Patent Application No. 201080067458.9, 2 pages.
Han et al. "Simplified SINR-based User Pairing Scheculing for Virtual MIMO" IEEE, 2009, 4 pages.
Han et al, "Simplified SINR-based User Pairing Scheduling for Virtual MIMO", 2009 IEEE 69th Vehicular Technology Conference; Apr. 26-29, 2009. Barcelona, Spain, 20090426 IEEE, Piscataway, NJ, USA, pp. 1-4.

Wang et al, "Spatial Multiuser Pairing Scheduling Strategies for Virtual MIMO Systems", Communication Systems, 2008, ICCS 2008, 11th IEEE Singapore International Conference, 20081119 IEEE, Piscataway, NJ, USA, pp. 823-827.
Motorola, "MCS Prediction in Support of Dynamic SU/MU-MIMO" 3GPP TSG RAN1#59, R1-094846, Jeju, South Korea, Nov. 9-13, 2009, 20091109 3rd Generation Partnership Project (3GPP), Mobile Competence Centre; 650, 1 route des Lucioles; F-06921 Sophia-Antipolis Cedex, France, pp. 1-6.
3GPP Standard; 3GPP TR 25.876, 2007-03, 3rd Generation Partnership Project; Technical Specification Group Radio Access Network; Multiple Input Multiple Output in UTRA; (Release 7), Mobile Competence Centre; 650, route des Lucioles; F-6921 Sophia-Antipolis Cedex, France, pp. 1-76.

* cited by examiner

METHOD AND DEVICE FOR SINR ESTIMATION

CROSS REFERENCE TO RELATED APPLICATION(S)

This application is a 35 U.S.C. §371 National Phase Entry Application from PCT/EP2010/056452, filed Jun. 16, 2010, designating the United States, the disclosure of which is incorporated herein in its entirety by reference.

TECHNICAL FIELD

The present invention discloses a method and a device for estimation of the SINR, the Signal to Interference and Noise Ratio, in a receiver in a mobile communications system such as, for example, an LTE system.

BACKGROUND

In a mobile communications system such as, for example, the LTE system, Long Term Evolution, the base station, i.e. the eNodeB, of a cell in the system performs the processes known as link adaptation of user equipments, UEs, and scheduling of UEs for transmission between the users and the eNodeB.

The link adaptation comprises choosing the MCS, (Modulation and Coding Scheme), for the traffic between a UE and the eNodeB. One parameter which needs to be determined in order to perform the link adaptation as well as the scheduling is the SINR, (Signal to Interference and Noise Ratio), of the channel which is used between the eNodeB and the UE. Since the link adaptation and scheduling are, per definition, performed for future time intervals, usually one or more TTIs, (Transmission Time Intervals), in an LTE system, the SINR for a channel is determined as a prediction, albeit with the use of the channel's history.

In order to compensate for unknown effects in the prediction such as SINR determination errors, fast fading channels, time varying interference, inter-symbol interference, receiver gain etc, a so called "SINR back-off" can be used, i.e. a determined SINR is decreased with a "back-off parameter". The back-off parameter can either be constant or it can be adapted to the results of previous traffic, i.e. using "channel history". In the latter case, the back-off parameter is typically increased if many transmission block errors occur, and decreased if no or few transmission block errors occur.

If an adaptive SINR back-off solution is used, several transmissions will be needed in order for the solution to "converge", and if channel conditions vary rapidly, convergence may be impossible to reach.

SUMMARY

It is a purpose of the present invention to offer an improvement in SINR determinations in a transceiver in a mobile communication system.

This purpose is met by the present invention in that it discloses a method for a transceiver in a mobile communications system for determining the SINR, (Signal to Interference and Noise Ratio), in the transceiver for signals from at least two User Equipments in the system during a future time interval.

The method comprises:
arranging the transceiver to receive transmissions from User Equipments in the mobile communications system on at least one radio channel per User Equipment, choosing the at least two User Equipments from a set of User Equipments in the mobile communications system which have data to transmit to the transceiver.

According to the invention, the method also comprises the following:
determining the radio channel characteristics during the future time interval for each of the at least two User Equipments,
emulating at least one of a plurality of receiver types available to the transceiver during said future time interval in order to determine a post demodulation channel for each of the at least two User Equipments, in which emulation the determined radio channel characteristics for the at least two User Equipments are used,
determining an SINR in the transceiver for the at least two User Equipments using the post demodulation channel for the at least two User Equipments.

In one embodiment, the method of the invention is used for adaptation of the at least two User Equipments in their transmissions to the receiver during the future time interval. In one such embodiment, the adaptation of the at least two User Equipments involves one or more of the following parameters to be used by the User Equipments in transmissions to the receiver during the future time interval:
Modulation type,
Bandwidth,
Coding Rate,
Output power,
Frequency interval in an available spectrum.

In one embodiment, the method of the invention is used for scheduling at least a sub-set of the plurality of User Equipments for transmission during the future time interval. In this embodiment, at least two sub-sets are selected from the plurality of User Equipments, the SINR in the receiver is determined for all User Equipments in both sub-sets during the future time interval, and one of the at least two sub-sets is selected for transmission during the future time interval. In the selection of said sub-set, one or more of the following parameters are used: the determined SINR in the transceiver, which User Equipments that have the largest amount of data to transmit, which User Equipments that have the longest time since their latest transmission and which User Equipments that have time-critical transmissions.

The invention also discloses a transceiver for a mobile communication system, which is arranged to function essentially according to the inventive method.

BRIEF DESCRIPTION OF THE DRAWINGS

The invention will be described in more detail in the following, with reference to the appended drawings, in which.

DETAILED DESCRIPTION

Figure 1:
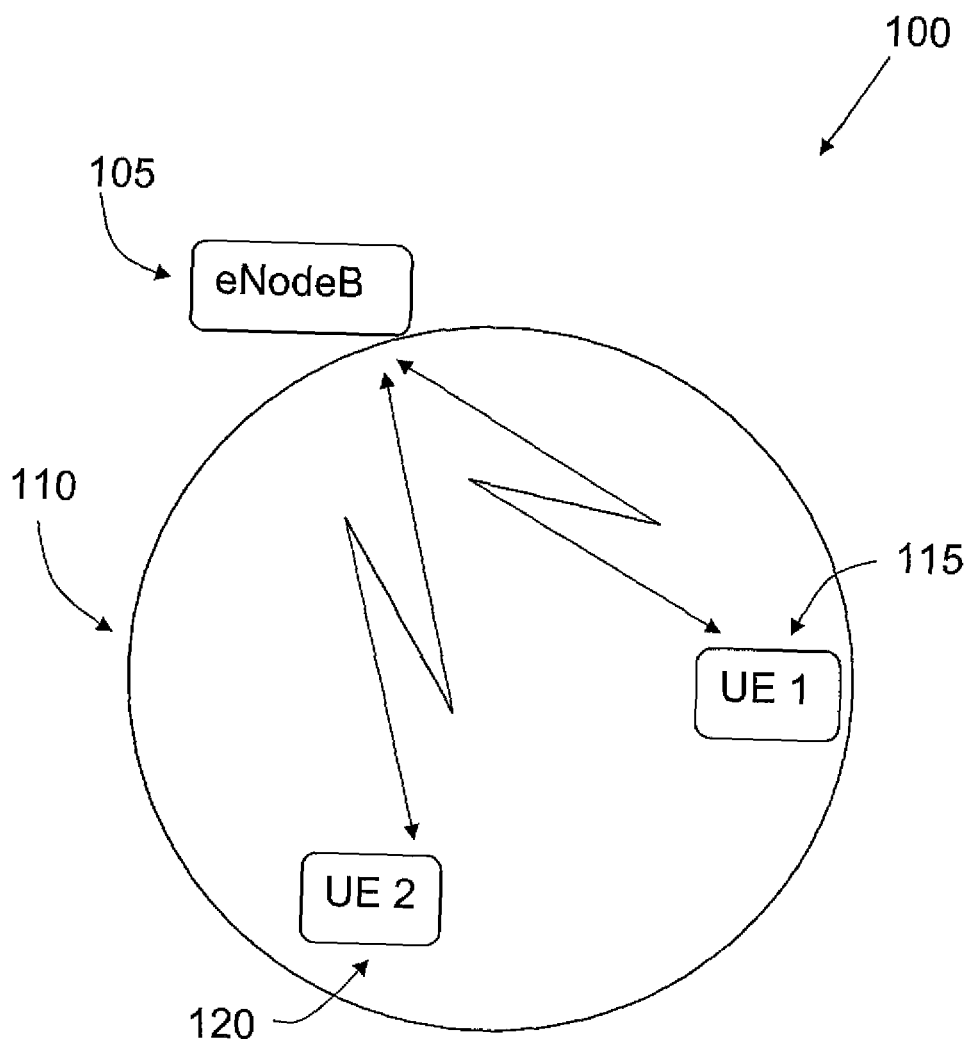
FIG. 1 shows an overview of a system in which the invention can be applied.

FIG. 1 shows a schematic view of an LTE system 100 in which the invention is suitable for application. The system 100 comprises one or more cells 110, each of which has a "base station", in the LTE case an eNodeB 105, attached to it as the controlling node of the cell 110. Each cell can accommodate one or more users, UEs, User Equipment, of which two 115, 120, are shown in FIG. 1.

As mentioned above, a goal of the present invention is to enable good SINR determination for a future time interval in a receiver in the system 100, where the future time interval suitably is one or more so called TTIs, Transmission Time Intervals, in the LTE system 100. The SINR estimation of the invention can in principle be carried out in either a UE or an eNodeB, although it will in the following be described as being carried out in the eNodeB.

In an LTE system, the eNodeB carries out so called link adaptation and scheduling of users, i.e. scheduling of transmissions between the UEs in a cell and the eNodeB of the cell. To this end, i.e. link adaptation and user scheduling, a good determination of the SINR for each of the UEs is important. In LTE, the term "link adaptation" refers to the choice of an appropriate MCS, (Modulation and Coding Scheme) for the transmissions in question. The scheduling and link adaptation will in the following be described for the uplink case, UL, i.e. transmissions from the UEs to the eNodeB, although the invention can in principle also be applied for the downlink case, DL, i.e. transmissions from the eNodeB to the UEs.

Below, a description will first be given of how the SINR determination of the invention is used by an eNodeB for scheduling of UL transmissions for users in a cell, following which a description will be given of how the SINR determination of the invention is used by an eNodeB for link adaptation of users in a cell.

Figure 2:
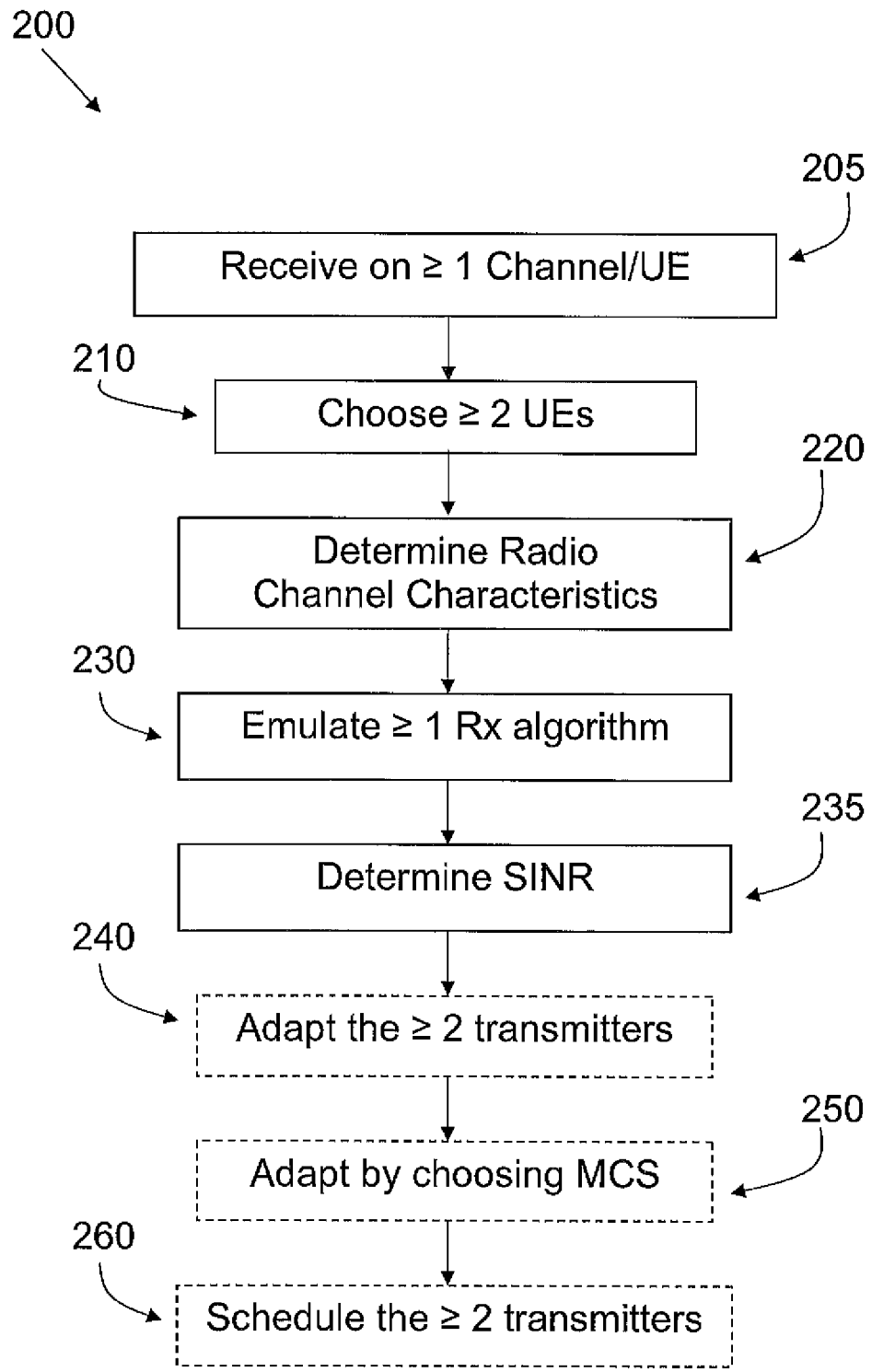
FIG. 2 shows a flow chart of a method of the invention.

FIG. 2 is a flowchart of a method 200 of the invention as used for UE UL scheduling in a transceiver, in this case the eNodeB. Steps which are options or alternatives are indicated by means of dashed lines in FIG. 2. As stated above, a purpose of the invention is to determine the SINR, the Signal to Interference and Noise Ratio, in the eNodeB for signals from at least two User Equipments in the system during a future time interval.

As indicated in step 205, the method 200 comprises arranging the eNodeB to receive transmissions from User Equipments in the mobile communications system, where each UE uses at least one channel for its transmissions to the receiver. The term "channel" here refers to the fact that both the UE and the eNodeB may be equipped with more than one antenna, in which case each combination of a UE antenna and an eNodeB antenna is considered a separate channel, also referred to as a "radio channel".

As shown in step 210, the method also comprises choosing the two UEs from a set of UEs in the mobile communications system which have data to transmit to the eNodeB.

According to the invention, the determination of SINR for scheduling (as well as the link adaptation) in the eNodeB of the UEs' UL transmissions comprises determining the characteristics of the UEs' UL radio channel or channels at the point in time for which the transmissions are scheduled. This is indicated in step 220, and is suitably carried out in a so called channel filter, the function of which suitably is as follows: A matrix $\hat{H}(m)$ and a matrix $\tilde{\Lambda}$ are determined in this step, the matrix $\hat{H}(m)$ and the matrix $\tilde{\Lambda}$ being defined as follows $\hat{H}(m)$ is a channel estimate matrix for sub-carrier m, in which the element in row i and j models the channel from user j to antenna i, including transmitter radio, transmitter antennas, air interface channel, receiver antennas, and receiver radio.

$\tilde{\Lambda}$ is a noise covariance matrix for the antennas in the eNodeB, in which matrix element $\lambda_{A,B}$ signifies the noise covariance between antennas A and B.

When the characteristics of the UEs' UL channel or channels at the point in time for which the transmissions are scheduled have been determined, those characteristic are used in an emulation of at least one receiver type which his available to the transceiver during the future time interval in question. The emulation is carried out in order to determine a post demodulation channel for each of the at least two UEs, and involves using the determined radio channel characteristics, step 220, for the UEs.

This is indicated in step 230, and will be described by means of an example in which the receiver in question is a so called MMSE receiver, (Minimum Square Error Receiver). It should be emphasized that the MMSE receiver is only an example used to describe a principle; in principle any receiver type can be emulated according to the present invention. In addition, if more than one receiver type is available in the transceiver, all of the available receiver types should be emulated. These emulations result in one SINR value for each combination of UE and emulated receiver. A choice of receiver type is done based on these SINR values. The different receivers typically have different processing requirements in terms of amount of calculations and use of processing resources. The choice of receiver type is also depending on available processing resources such as, for example, number of DSPs, (Digital Signal Processors), ASICs, FPGAs etc.

However, returning now to the example of an MMSE receiver, in this example a matrix $\hat{H}(m)$ is determined, the matrix $\hat{H}(m)$ being defined as a channel estimate matrix for the receiver, in which matrix element $\hat{h}_{x,y}(m)$ denotes the signal for user y at antenna x.

In the following, ( )* denotes conjugate and transposition.

The emulation of the MMSE receiver is performed by means of determining a frequency dependent weighting matrix W(m) as follows:

$$W(m) = (\hat{\Lambda} + \hat{H}(m)\hat{H}^*(m))^{-1}\hat{H}(m)$$

The channel estimate matrix $\hat{H}(m)$ is then multiplied with the frequency dependent weighting matrix W(m) such that $$\tilde{H}(m) = W^*(m)\hat{H}(m).$$

which is a channel estimate after the MMSE receiver.

In the system used as an example, i.e. the one shown in FIG. 1, the UEs transmit modulated symbols to the eNodeB precoded by a Discrete Fourier Transform, a DFT. In the present invention, the SINR is estimated based on the channel after the MMSE receiver's so called "post demodulation channel", i.e. the channel after equalization and antenna combining. Due to this fact, the "post demodulation channel" should also include an IDFT (Inverse Discrete Fourier Transform), which transforms the channel to the time domain. The IDFT of the channel estimate after MMSE receiver is denoted as $\tilde{G}$, and is shown below:

$$\tilde{G} = \frac{1}{N_c} \sum_{m=0}^{N_c-1} \tilde{H}(m)$$

$$= \begin{bmatrix} \tilde{g}_{0,0} & \tilde{g}_{0,1} & \cdots & \tilde{g}_{0,K-1} \\ \tilde{g}_{1,0} & \tilde{g}_{1,1} & & \\ \vdots & & \ddots & \\ \tilde{g}_{K-1,0} & & & \tilde{g}_{K-1,K-1} \end{bmatrix}$$

$$= \frac{1}{N_c} \sum_{m=0}^{N_c-1} \begin{bmatrix} \tilde{h}_{0,0}(m) & \tilde{h}_{0,1}(m) & \cdots & \tilde{h}_{0,K-1}(m) \\ \tilde{h}_{1,0}(m) & \tilde{h}_{1,1}(m) & & \\ \vdots & & \ddots & \\ \tilde{h}_{K-1,0}(m) & & & \tilde{h}_{K-1,K-1}(m) \end{bmatrix}$$

where matrix element $\tilde{g}hd\ x,y$ represents the signal for user y at antenna x, and N, is the number of sub carriers allocated to a user.

The residual noise after MMSE contains two components; additive noise filtered though the MMSE combining weights, and inter-symbol interference. An estimate of this filtered noise covariance matrix $\Lambda_N$ equals:

$$\Lambda_N = \sum_{m=0}^{N_c-1} W^*(m)\hat{\Lambda} W(m)$$

where $\hat{\Lambda}$ is the estimated noise covariance matrix from the channel filter and $W(m)$ is the MMSE combining matrix for sub carrier m.

The inter-symbol interference covariance matrix $\Lambda_{ISI}$ equals:

$$\Lambda_{ISI} = \sum_{m=0}^{N_c-1} \left(\tilde{H}(m) - \hat{H}_0\right)\left(\tilde{H}(m) - \hat{H}_0\right)^*$$

where $\hat{H}_0$ is a frequency domain representation of the single tap time domain channel estimate, and, in addition, $\hat{H}_0 = \tilde{G}$.

In total, the residual noise covariance, denoted as the matrix $\tilde{\Lambda}$ below, equals:

$$\tilde{\Lambda} = \Lambda_N + \Lambda_{ISI} = \begin{bmatrix} \tilde{\lambda}_{0,0} & \tilde{\lambda}_{0,1} & & \tilde{\lambda}_{0,K-1} \\ \tilde{\lambda}_{1,0} & \tilde{\lambda}_{1,1} & & \\ & & & \\ \tilde{\lambda}_{K-1,0} & & & \tilde{\lambda}_{K-1,K-1} \end{bmatrix}$$

The "post demodulation channel" $\tilde{G}$ as described above is then used in the SINR calculation as described next. However, it should be pointed out that the MMSE calculation as shown above is an example of a receiver type; the receiver type which is used should always correspond to the receiver types which are to be applied in the receiver when the user data is received.

As indicated in step 235 in FIG. 2, the SINR is determined for the transceiver during a future time interval by means of the emulated receiver and the channel characteristics. Thus, two cases for determining the SINR using the procedure described above will now be described. One is a case in which a single user detector is applied, and the other case is one in which an SIC (Successive Interference Cancellation) receiver is used.

Determining SINR, Single User Detector.

In the case of a single user detector, each user or stream is detected independently of the other users and streams. When determining the SINR for a single user detector, the channel of user k after equalization and antenna combination is used in the numerator, and other known users together with the residual noise are used in the denominator in the equation shown below. For the first user, the SINR is thus calculated as $$\Delta_0 = \frac{|\tilde{g}_{0,0}|^2}{\tilde{\lambda}_{0,0} + \sum_{i=1}^{K-1} |\tilde{g}_{0,i}|^2}$$

For user number k, the SINR is accordingly calculated as $$\Delta_k = \frac{|\tilde{g}_{k,k}|^2}{\tilde{\lambda}_{k,k} + \sum_{\substack{i=0 \\ i \neq k}}^{K-1} |\tilde{g}_{k,i}|^2}$$

Determining the SINR for an SIC Detector.

In an SIC receiver, (Successive Interference Cancellation), users are detected sequentially. Each user is equalized, transformed by an IDFT, scaled, soft values such as, for example, log-likelihood ratios, are calculated, a channel decoder is used to correct individual bit errors and to remove redundancy, and an CRC (Cyclic Redundancy Check), sum is calculated. The CRC sum is used for error detection, such that it is possible to determine if the reception of the user data is correct. If the first user which is processed results in a correct CRC sum, then the user data bits are re-encoded, transformed to the frequency domain and multiplied by the channel. This "reconstructed" signal for the first user is then subtracted from the received signal. The next user to be processed in the SIC receiver is then fed with a signal where the first user is subtracted. This process is then repeated for all users. In case some of the users resulted in a CRC error, the whole process can be repeated for those users in a second iteration.

According to the invention, a multitude of MMSE receivers structures are inserted as "post demodulation channel" calculation when an SIC receiver is applied on the user data. Suitably, the channels for all users which are scheduled are inserted.

Denote the channel matrix after equalization, combining and IDFT in the first SIC step as $\tilde{G}^{(0)}$, where $\tilde{G}^{(0)}$ is defined as follows:

$$\tilde{G}^{(0)} = \begin{bmatrix} \tilde{g}_{0,0}^{(0)} & \tilde{g}_{0,1}^{(0)} & \cdots & \tilde{g}_{0,K-1}^{(0)} \\ \tilde{g}_{1,0}^{(0)} & \tilde{g}_{1,1}^{(0)} & & \\ \vdots & & \ddots & \vdots \\ \tilde{g}_{K-1,0}^{(0)} & & \cdots & \tilde{g}_{K-1,K-1}^{(0)} \end{bmatrix}$$

and the residual noise covariance as $\tilde{\Lambda}^{(0)}$:

$$\tilde{\Lambda}^{(0)} = \begin{bmatrix} \tilde{\lambda}_{0,0}^{(0)} & \tilde{\lambda}_{0,1}^{(0)} & & \tilde{\lambda}_{0,K-1}^{(0)} \\ \tilde{\lambda}_{1,0}^{(0)} & \tilde{\lambda}_{1,1}^{(0)} & & \\ & & & \\ \tilde{\lambda}_{K-1,0}^{(0)} & & & \tilde{\lambda}_{K-1,K-1}^{(0)} \end{bmatrix}.$$

Note that it is the channels for the users which are scheduled to transmit which are to be inserted into the receiver emulation, i.e. in the present case the MMSE equations.

In the same manner, for SIC step number k, the channels for all users except the k−1 first ones are inserted into the MMSE equations. Denote the channel matrix after equalization and combining in SIC step number k as $$\tilde{G}^{(k)} = \begin{bmatrix} \tilde{g}_{1,1}^{(k)} & \cdots & \tilde{g}_{1,K-1}^{(k)} \\ \vdots & \ddots & \vdots \\ \tilde{g}_{K-1,1}^{(k)} & \cdots & \tilde{g}_{K-1,K-1}^{(k)} \end{bmatrix}$$

and the residual noise covariance as $$\tilde{\Lambda}^{(k)} = \begin{bmatrix} \tilde{\lambda}_{0,0}^{(k)} & \tilde{\lambda}_{0,1}^{(k)} & & \tilde{\lambda}_{0,K-1}^{(k)} \\ \tilde{\lambda}_{1,0}^{(k)} & \tilde{\lambda}_{1,1}^{(k)} & & \\ & & & \\ \tilde{\lambda}_{K-1,0}^{(k)} & & & \tilde{\lambda}_{K-1,K-1}^{(k)} \end{bmatrix}.$$

For the final SIC step, denote the scalar of the channel as $$\tilde{G}^{(K-1)} = \tilde{g}_{K-1,K-1}^{(K-1)}.$$

and the residual noise variance as $$\tilde{\Lambda}^{(K-1)} = \tilde{\lambda}_{K-1,K-1}^{(K-1)}.$$

When estimating the SINR for an SIC receiver, a desired user k is inserted in the numerator and residual noise and users not yet canceled are inserted in the denominator (all other known users are assumed to be cancelled) in the equation shown below.

For the first user in a SIC receiver, the SINR is thus $$\Delta_0 = \frac{|\tilde{g}_{0,0}^{(0)}|^2}{\tilde{\lambda}_{0,0}^{(0)} + \sum_{i=1}^{K-1} |\tilde{g}_{0,i}^{(0)}|^2}.$$

For user k the SINR is $$\Delta_k = \frac{|\tilde{g}_{k,k}^{(k)}|^2}{\tilde{\lambda}_{k,k}^{(k)} + \sum_{i=k+1}^{K-1} |\tilde{g}_{k,i}^{(k)}|^2},$$

and for the last SIC user, the SINR is $$\Delta_{K-1} = \frac{|\tilde{g}_{K-1,K-1}^{(K-1)}|^2}{\tilde{\lambda}_{K-1,K-1}^{(K-1)}}.$$

Thus, by determining the SINR after the MMSE receiver, the resulting SINR is a "post-demodulation SINR". By this way of calculating SINR, the users will have an increasing SINR as the index k increase. For link adaptation, this implies that the first users (those with low index k), will use a more robust modulation and coding scheme compared to "later" users (those with higher index k).

Note that only one row is used in the post demodulation channel for each SINR estimate. Thus, the MMSE equations can be significantly simplified such that only one row of each $\tilde{G}^{(k)}$, k=0, . . . , K-1, is calculated.

As indicated in step 240 in FIG. 2, the SINR which is determined according to the invention is, in one embodiment used for adaptation of the at least two User Equipments in their transmissions to the receiver during the future time interval. As indicated in steps 250 and 260 in FIG. 2, this adaptation can comprise choosing an MCS, Modulation and Coding Scheme, for the UEs during the future time interval, and/or scheduling the UEs for transmissions to the transceiver (i.e. UL transmissions) during the future time interval. This will be described below.

When the invention is used for link adaptation, a set of at least two UEs is used, chosen by a unit in the eNodeB known as the "UE scheduler". How the UE scheduler chooses the UEs that are comprised in the set of at least two UEs is not a part of this invention, and will for that reason not be described here.

Link Adaptation (Choice of MCS) by Means of the SINR

The UEs in the set which is received from the UE scheduler are processed in the "post demodulation channel" determination, i.e. in the receiver emulation and in the SINR estimation. The resulting SINR for each of the UEs in the set is then used for link adaptation of that UE, for example by means of a look-up table which gives link adaptation as a function of SINR.

Using the SINR for User Scheduling.

The sets of UEs which are chosen by the UE scheduler are "inserted" into the receiver emulation, i.e. in this case the MMSE equations, and then into the SINR estimation. The resulting SINR for each UE in such a UE combination is then used in order to decide which UE set to schedule, for example so that the UEs with the most favorable SINR are scheduled.

Figure 3:
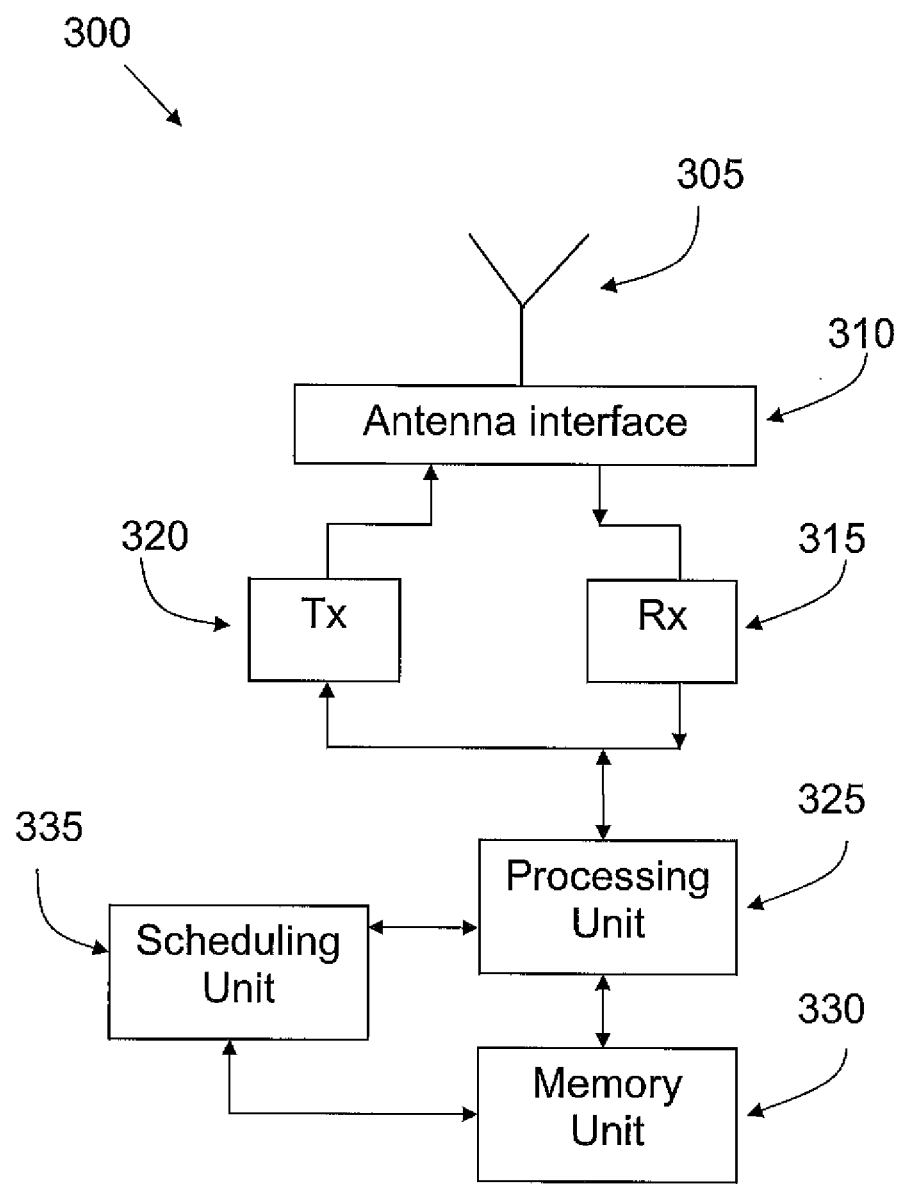
FIG. 3 shows a block diagram of a transceiver of the invention.

The invention also discloses a transceiver 300 for a mobile communications system. A schematic view of the transceiver 300 is shown in FIG. 3. As indicated in FIG. 3, the transceiver 300 comprises a processing unit 325 which is arranged to determine the SINR, the Signal to Interference and Noise Ratio, in the transceiver for signals from at least two User Equipments in the system during a future time interval. In addition, the transceiver 300 also comprises a receiver unit 315 which is arranged to receive transmissions from User Equipments in the mobile communications system on at least one radio channel per User Equipment. The processing unit 325 is further arranged to choose the at least two User Equipments from a set of User Equipments in the mobile communications system which have data to transmit to the transceiver.

According to the invention, the processing unit 325 of the transceiver 300 is also arranged to:
  determine the radio channel characteristics during the future time interval for each of the at least two User Equipments,
  emulate at least one of a plurality of receiver types available to the transceiver during the future time interval in order to determine a post modulation channel for each of the at least two User Equipments, in which emulation the determined radio channel characteristics for the at least two User Equipments are used,
  determine an SINR in the transceiver for the at least two User Equipments using the post modulation channel for the at least two User Equipments.

In addition, in one embodiment, the transceiver 300 comprises a transmission unit 320 for making transmissions to the User Equipments in the system, and in this embodiment the processing unit 325 is also arranged to adapt the at least two User Equipments in their transmissions to the transceiver 300 during the future time interval by means of transmissions from the transmission unit 320.

In addition, in one embodiment of the transceiver 300, the adaptation by the processing unit of the at least two User Equipments involves one or more of the following parameters to be used by the User Equipments in transmissions to the transceiver 300 during the future time interval:
Modulation type,
Bandwidth,
Coding Rate,
Output power,
Frequency interval in an available spectrum.

In one embodiment, the transceiver 300 additionally comprises a scheduling unit 335 which is arranged to schedule at least a sub-set of said plurality of User Equipments for transmission during the future time interval. The scheduling unit 335 is, in this embodiment, arranged to select at least two sub-sets from the plurality of User Equipments, determine the SINR in the receiver for both sub-sets during the future time interval and select for transmission during the future time interval one of the at least two sub-sets using one or more of the following parameters:
the determined SINR in the transceiver,
which User Equipments that have the largest amount of data to transmit,
which User Equipments that have the longest time since their latest transmission,
which User Equipments that have time-critical transmissions.

In one embodiment, the transceiver 300 is an LTE eNodeB adapted for communication, and the at least two User Equipments are LTE User Equipments, UEs.

As shown in FIG. 3, the transceiver 300 also comprises an antenna interface 310 by means of which the transmit unit 320 and the receive unit 315 interface with an antenna unit 305. In addition, the transceiver 300 also suitably comprises a memory unit 330 which interfaces with the scheduling unit 335 and the processing unit 325. Suitably, the memory unit 330 stores data for the scheduling unit 335 and the processing unit 325, as well as suitably storing instructions for the processing unit 325.

The invention is not limited to the examples of embodiments described above and shown in the drawings, but may be freely varied within the scope of the appended claims.

The invention claimed is:

1. A method for a transceiver in a mobile communications system to determine the SINR, Signal to Interference and Noise Ratio, in the transceiver for signals from at least two User Equipments in the mobile communications system during a future time interval, the method comprising:
arranging the transceiver to receive transmissions from User Equipments in the mobile communications system on at least one radio channel per User Equipment,
choosing the at least two User Equipments from a set of User Equipments in the mobile communications system which have data to transmit to the transceiver,
determining radio channel characteristics during a future time interval for each of the at least two User Equipments,
emulating at least one of a plurality of receiver types available to the transceiver during said future time interval in order to determine a post demodulation channel which is a channel after equalization and antenna combining, including an Inverse Discrete Fourier Transform, IDFT, which transforms the channel to a time domain, for each of the at least two User Equipments, in which emulation of the determined radio channel characteristics for the at least two User Equipments are used, and
determining an SINR in the transceiver for the at least two User Equipments using the post demodulation channel for the at least two User Equipments, wherein the emulating the at least one of the plurality of receiver types includes determining a frequency dependent weighting matrix $W(m)=W(m)=(\hat{\Lambda}+\hat{H}(m)\hat{H}^*(m))^{-1}\hat{H}(m)$.

2. The method of claim 1, further comprising adapting said at least two User Equipments in their transmissions to the receiver during the future time interval.

3. The method of claim 2, in which the adaptation of the at least two User Equipments involves one or more of the following parameters to be used by the User Equipments in transmissions to the receiver during the future time interval:
Modulation type,
Bandwidth,
Coding Rate,
Output power, and
Frequency interval in an available spectrum.

4. The method of claim 1, further comprising scheduling at least a sub-set of said plurality of User Equipments for transmission during the future time interval, selecting at least two sub-sets from the plurality of User Equipments, determining the SINR in the receiver for both sub-sets during the future time interval and selecting for transmission during the future time interval one of said at least two sub-sets using one or more of the following parameters: the determined SINR in the transceiver,
which User Equipments that have the largest amount of data to transmit,
which User Equipments that have the longest time since their latest transmission, and
which User Equipments that have time-critical transmissions.

5. The method of claim 1, applied in an LTE system, in which the transceiver is an LTE eNodeB and the at least two User Equipments are LTE User Equipments, UEs.

6. The method of claim 1, wherein the emulating at least one of the plurality of receiver types is performed by the transceiver.

7. The method of claim 1, wherein the determined SINR is used in an electronic look-up table to determine link adaption as a function of the SINR.

8. The method of claim 1, wherein the channel estimate is used to determine the IDFT.

9. The method of claim 1, wherein the determined SINR is a single value for each combination of a user equipment, UE, and all available receiver types to the UE.

10. A transceiver for a mobile communications system, comprising a processing unit arranged to determine the SINR, Signal to Interference and Noise Ratio, in the transceiver for signals from at least two User Equipments in the mobile communications system during a future time interval, and a receiver unit, wherein the receiver unit comprises a memory coupled to a processor, the receiver unit arranged to receive transmissions from User Equipments in the mobile communications system on at least one radio channel per User Equipment, wherein the processing unit is further arranged to choose the at least two User Equipments from a set of User Equipments in the mobile communications system which have data to transmit to the transceiver, and to:
determine radio channel characteristics during a future time interval for each of the at least two User Equipments,
emulate at least one of a plurality of receiver types available to the transceiver during the future time interval in order to determine a post demodulation channel which is a channel after equalization and antenna combining, including an Inverse Discrete Fourier Transform, IDFT, which transforms the channel to a time domain, for each of the at least two User Equipments, in which emulation the determined radio channel characteristics for the at least two User Equipments are used, and determine an SINR in the transceiver for the at least two User Equipments using the post demodulation channel for the at least two User Equipments, wherein the emulating the at least one of the plurality of receiver types includes determining a frequency dependent weighting matrix $W(m)=W(m)=(\hat{\Lambda}+\hat{H}(m)\hat{H}^*(m))^{-1}\hat{H}(m)$.

11. The transceiver of claim 10, further comprising a transmission unit, wherein the transmission unit comprises a memory combined with a processor, for making transmissions to the User Equipments in the system, and wherein the processing unit is further arranged to adapt the at least two User Equipments in their transmissions to the transceiver during the future time interval by means of transmissions from the transmission unit.

12. The transceiver of claim 11 in which the adaptation by the processing unit of the at least two User Equipments involves one or more of the following parameters to be used by the User Equipments in transmissions to the transceiver during the future time interval:

Modulation type,
Bandwidth,
Coding Rate,
Output power, and
Frequency interval in an available spectrum.

13. The transceiver of claim 10, further comprising a scheduling unit arranged to schedule at least a sub-set of said plurality of User Equipments for transmission during the future time interval, select at least two sub-sets from the plurality of User Equipments, determine the SINR in the receiver for both sub-sets during the future time interval and select for transmission during the future time interval one of said at least two sub-sets using one or more of the following parameters: the determined SINR in the transceiver, which User Equipments that have the largest amount of data to transmit, which User Equipments that have the longest time since their latest transmission, and which User Equipments that have time-critical transmissions.

14. The transceiver of claim 10, being an LTE eNodeB adapted for communication, with the at least two User Equipments being LTE User Equipments, UEs.

* * * * *